United States Patent Office 3,259,247
Patented July 5, 1966

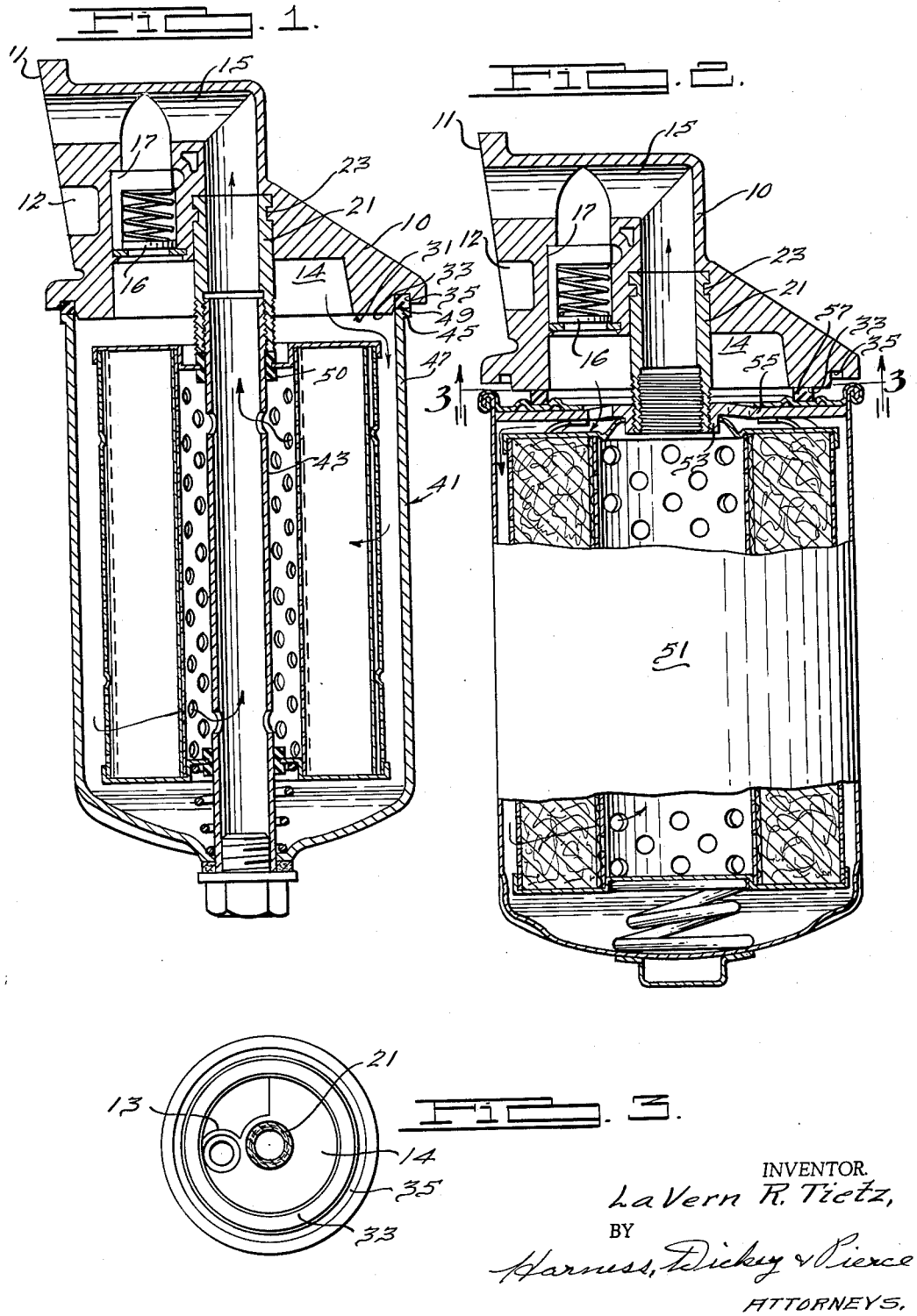

3,259,247
FILTER
La Vern R. Tietz, Racine, Wis., assignor to Walker Manufacturing Company, a corporation of Delaware
Filed Jan. 15, 1963, Ser. No. 251,635
1 Claim. (Cl. 210—444)

This invention relates to oil filter assemblies for internal combustion engines and, in particular, refers to the base on which the filter body and casing is mounted.

Currently two different types of oil filter units are in widespread use in the automotive field. One of these is the throwaway unit in which the filter body is permanently enclosed in a casing and both are thrown away when the filter material loses its effectiveness. The other of these is the replaceable element type unit in which the filter body can be removed from the casing and replaced with a fresh one when necessary.

Throwaway units are usually installed as original equipment by the manufacturer and their use is ordinarily continued by individual automobile owners. However, the maintenance cost for the replaceable element type unit is lower, since only the filter element is replaced, and consequently it is preferred by fleet owners, truck owners, the military service, and others to whom maximum economy of operation is an important consideration.

Both units are removably mounted on a filter base which is secured to the engine. However, the two units are secured and sealed in different ways when they are mounted and this demands cooperative structure on the base. Hence, two different base structures have been required for the two different oil filter units.

With the foregoing background in mind, it is the object of the present invention to provide a single base structure that may be used as desired with either type of oil filter unit.

To attain this important object, the base is provided with a centrally disposed hollow stud which is threaded on the inside to engage the threaded end of the stand pipe of the replaceable element type unit. The stud is threaded on the outside to engage a threaded part of the bottom plate of the throwaway type filter. Also, the base is provided with a groove to receive a gasket to seal the end of the outer shell of the replaceable element type unit and with an extended sealing surface to engage a sealing gasket carried by the throwaway type filter unit to seal the end of the outer shell thereof. Thus, the base of the device is designed to accept either type of filter with equal facility.

Further objects of this invention are to provide a device of this type which is efficient, durable, compact, and of simple construction, comprising a minimum number of parts whereby it may be economically manufactured and easily assembled.

The various objects and advantages, and the novel details of construction of one commercially practical embodiment of the invention, will become more apparent as this description proceeds, especially when considered in connection with the accompanying drawings in which:

FIGURE 1 is a longitudinal sectional elevational view of a filter showing a base constructed in accordance with this invention, with a replaceable element type filter unit attached thereto;

FIG. 2 is a similar view showing a disposable or throwaway type filter unit attached to the base; and FIG. 3 is a sectional view taken substantially on the plane indicated by line 3—3 of FIG. 2, on a smaller scale.

Referring to the drawings, the base casting 10 is in general of a known type and has a face 11 adapted to be bolted to an engine (not shown). The face has a recess 12 which is an inlet chamber for oil to be filtered, such oil flowing through a passage (not shown) in the base to its opening 13 in recess or chamber 14 on the bottom of the base from whence it flows into the filter unit. Oil that has been filtered leaves the base through the passage 15. If the filter becomes clogged, the pressure in chamber 14 will increase to the point where relief valve 16 is unseated to permit oil to by-pass the filter unit and flow through passage 17 in the base into the outlet passage 15.

In accordance with the invention a hollow stud 21, having a locking groove 23, is integral with the base 10, being cast therein during manufacture of the base. The end of the stud is threaded on both the inside and the outside whereby either of the two types of filter units can be secured to the base.

In further accord with the invention, the bottom face 31 of the base 10 is provided with a flat annular surface 33 and an annular groove 35 whereby either of the two types of filter units may be sealed to the base.

In FIG. 1, a replaceable element type of filter unit 41 is secured to the base 10. In this case the stand pipe 43 is threaded inside the stud 21 so that the outer top edge 45 of the casing 47 can compress the gasket 49 tightly in groove 35. Gasket 50 provides a seal between the filter center tube and the end of stud 21.

In FIG. 2, a throwaway filter unit 51 is secured to the base 10. In this case the collar 53 on the base plate 55 of the unit 51 is threaded on the outside of stud 21 so that the gasket 57 is compressed against the flat surface 33.

I claim:
A filter base for attachment to motor vehicle engines and adapted to selectively receive either one of first and second type filters, said first type comprising an outer shell containing a filter element and a center tube externally threaded at one end and said second type comprising a throwaway housing permanently enclosing a filter element and having a bottom plate with an internally threaded collar, said filter base comprising a body having a filter receiving side, said side including a chamber, a passage in said body directly communicating with said chamber, and an outlet tube centrally located in and extending out of said chamber, said side including a relatively wide flat annular face forming a radially extending sealing surface surrounding said chamber and protruding from said side and located at substantially a right angle to the axis of the outlet tube, said side including an annular groove disposed radially inwardly from the outer periphery of said side and surrounding said annular face, said outlet tube being internally threaded to receive the threaded end of the center tube of said first type filter and said groove being located in alignment with the end of the outer shell of said first type filter when said center tube is threaded in said outlet tube whereby said shell end may be sealed by a gasket in said groove, said outlet tube being externally threaded to receive the threaded collar of said second type filter and said flat annular face being located in alignment with the bottom plate of said second type filter when said collar is threaded on said outlet tube whereby said bottom plate may be sealed by a gasket against said annular face.

(References on following page)

References Cited by the Examiner

UNITED STATES PATENTS

| | | | |
|---|---|---|---|
| 2,076,935 | 4/1937 | Burckhalter | 210—442 X |
| 2,430,713 | 11/1947 | Eves et al. | 210—443 X |
| 2,522,565 | 9/1950 | Burhans | 210—443 |
| 2,543,165 | 2/1951 | Harlan | 210—440 X |
| 2,884,133 | 4/1959 | Walulik | 210—136 X |
| 2,897,966 | 8/1959 | Humbert | 210—133 X |

REUBEN FRIEDMAN, *Primary Examiner.*

HERBERT L. MARTIN, *Examiner.*

F. W. MEDLEY, *Assistant Examiner.*